(12) United States Patent
Wang et al.

(10) Patent No.: US 10,566,640 B2
(45) Date of Patent: Feb. 18, 2020

(54) COMPOSITE PROTON CONDUCTING ELECTROLYTE WITH IMPROVED ADDITIVES FOR FUEL CELLS

(71) Applicants: Daimler AG, Stuttgart (DE); Ford Motor Company, Dearborn, MI (US)

(72) Inventors: Keping Wang, New Westminster (CA); Yunsong Yang, Surrey (CA); Carmen Chuy, Burnaby (CA); Jing Li, Burnaby (CA); Owen Thomas, Vancouver (CA); Yuquan Zou, Surrey (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 423 days.

(21) Appl. No.: 15/213,498

(22) Filed: Jul. 19, 2016

(65) Prior Publication Data

US 2017/0025699 A1 Jan. 26, 2017

Related U.S. Application Data

(60) Provisional application No. 62/196,872, filed on Jul. 24, 2015.

(51) Int. Cl.
| | |
|---|---|
| *H01M 8/1051* | (2016.01) |
| *H01M 8/1023* | (2016.01) |
| *H01M 8/1039* | (2016.01) |
| *H01M 8/1004* | (2016.01) |
| *H01M 8/1069* | (2016.01) |
| *C08J 5/22* | (2006.01) |

(52) U.S. Cl.
CPC ......... *H01M 8/1051* (2013.01); *C08J 5/2225* (2013.01); *H01M 8/1039* (2013.01); *H01M 8/1069* (2013.01); *H01M 2250/20* (2013.01); *H01M 2300/0082* (2013.01)

(58) Field of Classification Search
CPC ............ H01M 8/1051; H01M 8/1004; H01M 8/1023; H01M 8/1039; H01M 2008/1095
See application file for complete search history.

(56) References Cited

U.S. PATENT DOCUMENTS

| | | |
|---|---|---|
| 6,607,856 B2 | 8/2003 | Suzuki et al. |
| 2004/0043283 A1 | 3/2004 | Cipollini et al. |
| 2004/0127588 A1* | 7/2004 | Calumdann ............ B01D 71/62 521/27 |
| 2006/0046120 A1 | 3/2006 | Merzougui et al. |
| 2006/0222921 A1 | 10/2006 | Mance et al. |
| 2007/0072036 A1 | 3/2007 | Berta et al. |
| 2007/0154764 A1 | 7/2007 | MacKinnon et al. |
| 2011/0111321 A1 | 5/2011 | Yang et al. |
| 2012/0225361 A1 | 9/2012 | Wang et al. |

FOREIGN PATENT DOCUMENTS

| | | |
|---|---|---|
| WO | 2005060039 A1 | 6/2005 |
| WO | 2007144633 A1 | 12/2007 |
| WO | 2011057769 A1 | 5/2011 |

* cited by examiner

*Primary Examiner* — Osei K Amponsah
(74) *Attorney, Agent, or Firm* — Patent Central LLC; Stephan A. Pendorf

(57) ABSTRACT

Improved additives can be used to prepare polymer electrolyte for membrane electrode assemblies in polymer electrolyte fuel cells. Use of these improved additives can not only improve durability and performance, but can also provide a marked performance improvement during initial conditioning of the fuel cells. The additives are chemical complexes comprising certain metal and organic ligand components.

19 Claims, 8 Drawing Sheets

COMPOSITE PROTON CONDUCTING ELECTROLYTE WITH IMPROVED ADDITIVES FOR FUEL CELLS

BACKGROUND

Field of the Invention

This invention relates to additives for the proton conducting polymer electrolyte used in membranes, catalyst layers, and the like in fuel cells. In particular, it relates to additives for improved durability and performance thereof.

Description of the Related Art

Sustained research and development effort continues on fuel cells because of the energy efficiency and environmental benefits they can potentially provide. Solid polymer electrolyte fuel cells show particular potential for use as power supplies in traction applications, e.g. automotive. However, various challenges remain in obtaining desired performance and cost targets before fuel cells are widely adopted for automotive applications in particular.

Solid polymer electrolyte fuel cells (also known as proton exchange membrane fuel cells) convert reactants, namely fuel (such as hydrogen) and oxidant (such as oxygen or air), to generate electric power. They generally employ a proton conducting polymer membrane electrolyte between two electrodes, namely a cathode and an anode. Appropriate catalyst compositions (typically supported platinum or platinum alloy compositions) are employed at each electrode to increase the reaction rate. A structure comprising a membrane electrolyte sandwiched between these two electrodes is known as a membrane electrode assembly (MEA). Porous gas diffusion layers (GDLs) are usually employed adjacent the two electrodes to assist in diffusing the reactant gases evenly to the electrodes. Further, an anode flow field plate and a cathode flow field plate, each comprising numerous fluid distribution channels for the reactants, are provided adjacent the anode and cathode GDLs respectively to distribute reactants to the respective electrodes and to remove by-products of the electrochemical reactions taking place within the fuel cell.

Water is the primary by-product in a cell operating on hydrogen and air reactants. Because the output voltage of a single cell is of order of 1V, a plurality of cells is usually stacked together in series for commercial applications. In such a stack, the anode flow field plate of one cell is thus adjacent to the cathode flow field plate of the adjacent cell. For assembly purposes, a set of anode flow field plates is often bonded to a corresponding set of cathode flow field plates prior to assembling the stack. A bonded pair of an anode and a cathode flow field plate is known as a bipolar plate assembly. Fuel cell stacks can be further connected in arrays of interconnected stacks in series and/or parallel for use in automotive applications and the like.

MEA durability is one of the most important issues for the development of fuel cell systems in either stationary or transportation applications. For automotive applications, an MEA is required to demonstrate durability of about 6,000 hours.

In such cells, the membrane electrolyte serves as a separator to prevent mixing of reactant gases and as an electrolyte for transporting protons from anode to cathode. Perfluorosulfonic acid (PFSA) ionomer, e.g., Nafion®, has been the material of choice to date and the technology standard for membranes. Nafion® consists of a perfluorinated backbone that bears pendent vinyl ether side chains, terminating with $SO_3H$.

Failure of the membrane as an electrolyte will result in decreased performance due to increased ionic resistance, and failure of the membrane as a separator will result in fuel cell failure due to mixing of anode and cathode reactant gases. The chemical degradation of PFSA membrane during fuel cell operation is proposed to proceed via the attack of hydroxyl (—OH) or peroxyl (—OOH) radical species on weak groups (such as a carboxylic acid group) on the ionomer molecular chain. The free radicals may be generated by the decomposition of hydrogen peroxide with impurities (such as $Fe^{2+}$) in a Fenton type reaction. In fuel cells, hydrogen peroxide can be formed either at Pt supported on carbon black in the catalyst layers or during the oxygen reduction reaction.

The hydroxyl radical attacks the polymer unstable end groups to cause chain zipping and/or could also attack an $SO_3^-$ group under dry conditions to cause polymer chain scission. Both attacks degrade the membrane and eventually lead to membrane cracking, thinning or forming of pinholes. The membrane degradation rate is accelerated significantly with increasing of the operation temperature and with decreasing inlet gas relative humidity (RH).

Different additives to the membrane electrolyte have been studied for purposes of improving the performance and/or durability of the membrane. These additives include: 1) hygroscopic particles made of metal oxide, such as silica or zirconium dioxide, heteropoly acids, phosphonate silica, etc. to improve MEA performance under low RH conditions by increasing water retention (e.g. US20070154764); 2) Pt catalyst particles dispersed in the electrolyte membrane to improve membrane durability as well as membrane performance under low RH (e.g. US20070072036); 3) metal elements or compositions containing metal elements or metal alloys that act as a free radical scavenger or hydrogen peroxide decomposition catalyst (e.g. US2004043283); 4) phenol type antioxidants where the antioxidant can be a small molecule or a polymer (e.g. US2006046120); 5) organic crown compounds (e.g. US20060222921) or macrocyclic compounds containing metal or metalloids (e.g. WO2007144633); and 6) cation chelating agents to reduce formation of free radicals (e.g. U.S. Pat. No. 6,607,856).

Additives are also disclosed in WO2005060039 to address the problem in PEM fuel cell durability of premature failure of the ion-exchange membrane. The degradation of the ion-exchange membrane by reactive hydrogen peroxide species can be reduced or eliminated by the presence of an additive in the anode, cathode or ion-exchange membrane. The additive may be a radical scavenger, a membrane cross-linker, a hydrogen peroxide decomposition catalyst and/or a hydrogen peroxide stabilizer. The presence of the additive in the membrane electrode assembly (MEA) may however result in reduced performance of the PEM fuel cell. In particular, suggested additives include an organometallic Mn (II) or Mn (III) complex having an organic ligand selected from CyDTA, ENTMP, gluconate, N, N'-bis (salicylidene) propylenediamine, porphyrins, phthalocyanines, phenanthroline, hydrazine, pyrocatechol-3,5-disulphonic acid disodium salt, triethylenetetraamine, Schiff base macrocycles and EDDA.

In commonly owned published US patent application number US20110111321, certain ligand additives (e.g. 1,10-phenanthroline or 2,2'-bipyridine) were disclosed that meet many of these needs. The use of these ligand additives in the membrane and/or catalyst layers can improve durability but, depending on testing conditions, there may be a modest penalty in fuel cell performance (e.g. 3 times better stability might be obtained but with a 20 mV loss in voltage under load). Preferably, both durability and performance of fuel cells would be improved with appropriate additives.

In commonly owned published PCT application number WO2011/057769 (also US20120225361) which are incorporated herein by reference in their entirety, additives are disclosed which can be used to prepare polymer electrolyte for membrane electrode assemblies in polymer electrolyte fuel cells in order to improve both durability and performance. The additives are chemical complexes comprising certain metal and organic ligand components.

Accordingly, there remains a need for improved additive technology that provides additional resistance of MEAs, and particularly PFSA membranes of the MEAs, to degradation, resulting in improved MEA durability and performance in a fuel cell. This invention fulfills these needs and provides further related advantages.

SUMMARY

Certain organic ligand moieties have been discovered that can provide surprising benefits when used in metal-ligand complex additives in a proton conducting composite polymer electrolyte for use in solid polymer electrolyte fuel cells. The use of such ligands can provide improved performance during the initial conditioning operation for such fuel cells as well as an improvement in durability. Herein, these ligands are denoted as $1^{st}$ ligands and the complex additives comprising them are denoted as ($1^{st}$ ligand)(metal) where (metal) refers to the metal component and ($1^{st}$ ligand) refers to the $1^{st}$ ligand component in the complex additive. The composite polymer electrolyte thus comprises a proton conducting ionomer and an amount of a (1st ligand)(metal) complex additive.

More specifically, the composite polymer electrolyte is for a membrane electrode assembly in a solid polymer electrolyte fuel cell and comprises a proton conducting ionomer and an amount of a ($1^{st}$ ligand)(metal) complex additive. The metal component in the additives of the invention includes a suitable metal in elemental form or as part of another molecule. In particular, the (metal) in the complex can be selected from the group consisting of metals, metal alloys, metal oxides, metal salts and combinations thereof. Precursors for the (metal) may include Pd, Pt, platinum supported on carbon, $Pt(NH_3)_4(NO_3)_2$, $PtCl_4$, Mn, Co, Rh, Cu, Os, Ni, Ir, Ag, Ti, Ce, Ru, Cr, Zr, Fe, $CeO_2$, $RuO_2$, $WO_3$, $CePO_4$, $CrPO_4$, $AlPO_4$, $CeF_3$, $SiO_2$, $Ce(NO_3)_3 \cdot 6H_2O$, $Ce(SO_4)_2$, $MnO_2$, $Mn_2O_3$, MnO, $MnSO_4$, $MnCl_2$, $Mn(CH_3COO)_2 \cdot 4H_2O$, $Mn(NO_3)_2$, $CoCl_2$, $Co(NO_3)_2$, $CoBr_2$, $Co_3(PO_4)_2$, $Co(CH_3COO)_2$, $CoSO_4$, $Co(H_2PO_4)_2$, $NiF_2$, $NiSO_4$, $NiBr_2$, $NiCl_2$, $Ni_3(PO4)_2$, $Ni(CH_3COO)_2$, $Ni(OH)_3$, $Ni_2O_3$, NiO, $Fe_3O_4$, $Fe_2O_3$, $FeCl_2$, $FeCl_3$, $Ce(NO_3)_3$, $ZnO_2$, $ZnCl_2$, $Zn(NO_3)_2$, $TiF_2$, $TiF_4$, CuCl, $CuCl_2$, $CuSO_4$, Cu—Ni alloy, Pt—Co alloy, Pt—Au alloy, and $RuO_2$—$AO_2O_3$. Particularly preferred metals in the (metal) component are Mn, Ce, Co, Fe, Cu, Pd, Pt, Pt—Co, or their ions. More preferred metals in the (metal) component are Mn, Ce, Pt, Co or their ions.

The ($1^{st}$ ligand) in the complex comprises a molecule or polymer bearing the metal chelating moieties of the molecule wherein the chemical structure of the molecule is a derivative of the heterocycle quinoline. In exemplary embodiments, the (metal) can be Ce or Mn and the ($1^{st}$ ligand) can be 8-hydroxyquinoline or the 8-hydroxyquinoline derivative 5,7-diphenylquinolin-8-ol (both of which are derivatives of the heterocycle quinoline) with the respective chemical structures:

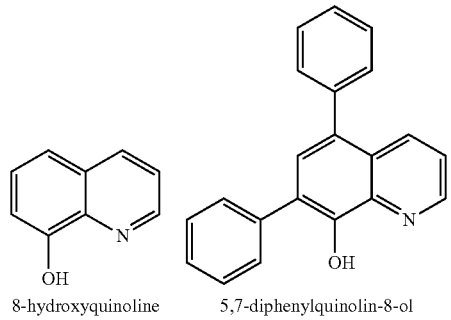

8-hydroxyquinoline    5,7-diphenylquinolin-8-ol

In a preferred embodiment, the complex additive in the composite polymer electrolyte comprises a $2^{nd}$ ligand. Such a complex additive is represented as a ($1^{st}$ ligand)(metal)($2^{nd}$ ligand) complex additive. Here, $2^{nd}$ ligand component in the additives are certain small organic molecules, or polymers or copolymers thereof, in which the molecules comprise at least two nitrogen atoms in their structure that are capable of forming a complex with a metal or metal ion. In particular, the ligand can be selected from the group consisting of molecules having the following chemical structures:

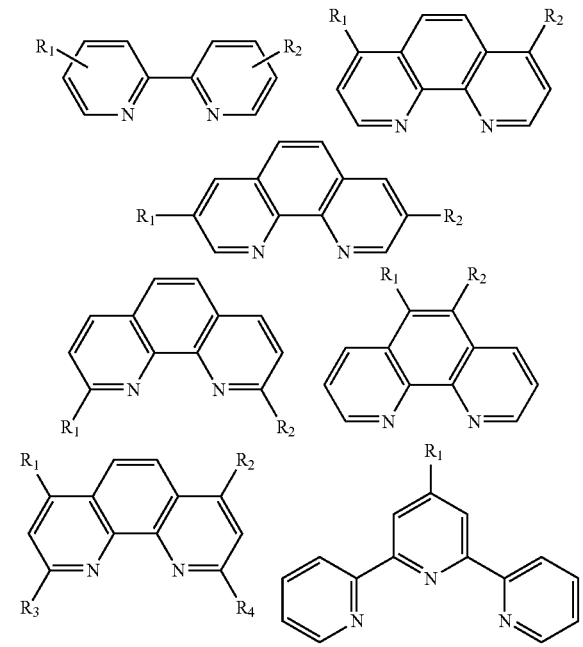

where
$R_1$ is H, $CH_3(CH_2)_n$, $CH_3(CH_2)_nO$, $CF_3(CF_2)_n$, $CF_3(CF_2)_nO$, COOH, $PO(OH)_2$, $SO_3H$, $NH_2$, OH, or

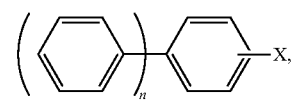

X is H, COOH, $PO(OH)_2$ or $SO_3H$, and n is an integer from 0 to 10;
and
$R_2$ can be any of the same groups as $R_1$ except for H (hydrogen). In exemplary embodiments, the ($2^{nd}$ ligand) can be bathophenanthroline, and the complex additive can be:

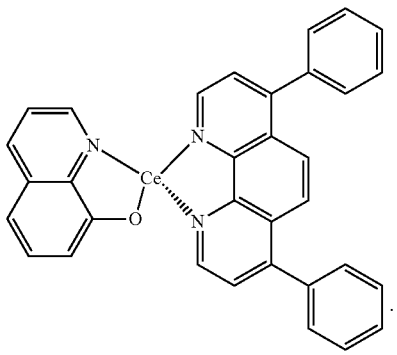

The additive can be used in the preparation of a composite PFSA or hydrocarbon electrolyte to improve durability and performance of fuel cells. The composite polymer electrolyte comprises a conventional perfluorosulfonic acid ionomer or hydrocarbon ionomer plus a suitable amount of additive.

One method for preparing such a composite is to first synthesize the additive from a desired starting $1^{st}$ ligand, and optionally a $2^{nd}$ ligand and/or other ligands, and metal precursors. The improved electrolyte composite can then be prepared by dissolving the synthesized complex additive in a conventional PFSA ionomer dispersion or hydrocarbon ionomer solution. The composite dispersion/solution can then be used to cast membrane electrolyte or to prepare catalyst layers as desired.

Alternatively however, the additive can be prepared in-situ, such as by mixing a suitable starting $1^{st}$ ligand, optionally a $2^{nd}$ ligand and/or other ligands, and metal precursors into a dispersion or solution of a desired conventional ionomer. Where possible, this procedure is preferred as it saves preparation steps.

In exemplary embodiments, the precursor for the (metal) can be $Ce_2(CO_3)_3 \cdot xH_2O$, the ($1^{st}$ ligand) can be 8-hydroxyquinoline, and the proton conducting ionomer can be perfluorosulfonic acid ionomer. Further, an optional ($2^{nd}$ ligand) can be bathophenanthroline.

The invention therefore includes composite electrolyte materials comprising the aforementioned additives, fuel cells comprising such materials such as in membrane or catalyst layers, and methods of preparing such composite electrolytes, membranes, catalyst layers, and fuel cells.

These and other aspects of the invention are evident upon reference to the attached Figures and following detailed description.

DETAILED DESCRIPTION

Herein, in a quantitative context, the term "about" should be construed as being in the range up to plus 10% and down to minus 10%.

The present invention relates to improved complex additives for use in polymer electrolytes in membrane electrode assemblies in solid polymer electrolyte fuel cells. The additives comprise a metal component and a $1^{st}$ organic ligand component wherein the metal component and the $1^{st}$ ligand component form a complex. Herein, these complex additives are denoted as ($1^{st}$ ligand)(metal).

Incorporating improved ($1^{st}$ ligand)(metal) complex additives in the electrolyte can provide a durability benefit but also a marked performance improvement during initial conditioning of such fuel cells. Initial conditioning is important because fuel cell performance is not optimal when operated for the first time. It can take some operating time or "conditioning" until the fuel cell operates at its nominal output. The reasons for this are not well understood.

The metal component in an additive of the invention can include suitable metals in elemental form or as part of another molecule. Preferred metals in the metal component are metals whose complexes with the $1^{st}$ ligand component provide a good catalyst to decompose hydrogen peroxide in a non-Fenton chemistry as well as a good catalyst to catalyze the oxidation of hydrogen with oxygen. Exemplary suitable metals for the metal component include Ce and/or Mn. However, the metal component can be any of an elemental metal or a metal alloy, metal oxide, metal salt or any combination thereof.

The $1^{st}$ ligand component is a derivative of the heterocycle quinoline, such as 8-hydroxyquinoline and its derivatives (e.g. 5,7-diphenylquinolin-8-ol). Hydroxyquinoline is a suitable compound for this purpose because it is a known stabilizer of hydrogen peroxide (as disclosed for instance in U.S. Pat. Nos. 2,783,132, 3,053,632, and/or 4,022,703). In neutral solution, the hydroxyl unit is in the protonated form (pKa=9.89) and the nitrogen is not protonated (pKa=5.13). However, an excited-state Zwitterionic isomer exists in which $H^+$ is transferred from the oxygen (giving an oxygen anion) to the nitrogen (giving a protonated nitrogen cation). Without being bound by theory, it is believed this may facilitate proton transfer in the membrane electrolyte compared to bidentate chelating ligands, and thus may not impact membrane performance when used in an additive.

Figure 1A:
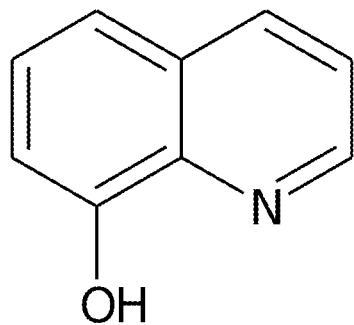
FIG. 1a shows the chemical structure of an exemplary improved and/or additional ligand of the invention (i.e. 8-hydroxyquinoline).
Figure 1B:
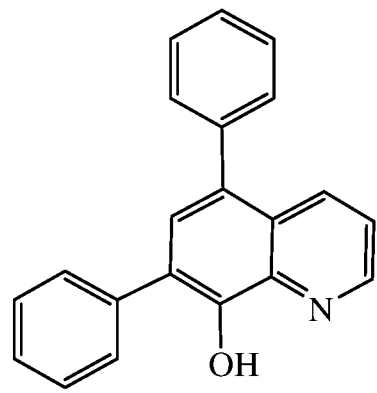
FIG. 1b shows the chemical structure of an exemplary improved and/or additional ligand of the invention (i.e. 5,7-diphenylquinolin-8-ol).

FIGS. 1a and 1b show the chemical structures of 8-hydroxyquinoline and its derivative 5,7-diphenylquinolin-8-ol respectively, which are mentioned above as exemplary $1^{st}$ ligands for use in the present invention. They are particularly preferred for use as a $1^{st}$ ligand when employing Ce as the (metal) in the complex additive. For instance, as disclosed in US853552881 and other references, the functional group 8-hydroxyquinoline is known to be an excellent ligand for capturing metals, and particularly Ce. Advantageously, 8-hydroxyquinoline is a relatively common chemical and is relatively inexpensive.

The $1^{st}$ ligand can be a small molecule of 8-hydroxyquinoline or its derivatives. $1^{st}$ ligands may also be polymers bearing 8-hydroxyquinoline units and in that regard, the complex forming units can be either on the polymer backbone or on side chains. The additives can be homopolymers of complex forming units or copolymers of complex forming units with an aromatic structure (such as poly(ether ketone), poly(ether sulfone), poly(phenylene), etc). Copolymers can be random or block copolymers. When a complex forming unit is on the polymer side chain, it can be directly attached to the polymer backbone or attached via a spacer. The polymer backbone can be an aromatic, semi- or perfluoro aliphatic polymer. On each side chain, there can be one complex forming unit or multiple complex forming units.

The use of other additives known in the art, such as those disclosed in the aforementioned WO2011/057769, can also provide significant durability and other benefits to fuel cells.

However, it has been found that use of these other additives can so adversely affect the initial fuel cell operation that the fuel cells may not be acceptable for certain applications (illustrated in FIG. 2 below). Specifically, the lower initial voltage output and extended conditioning time required to overcome that may not be deemed acceptable. Use of the present invention can acceptably address this problem by providing a marked performance improvement during initial conditioning of the fuel cells. In addition though, use of the present invention can also provide further durability benefits as demonstrated in the Examples below.

The present invention can conveniently be applied with the additives of WO2011/057769 simply by incorporating a suitable ($1^{st}$ ligand) directly into the complex additives of WO2011/057769. That is, if the additives of WO2011/057769 are denoted by (metal)($2^{nd}$ ligand), the present invention can be applied by creating a complex additive denoted by ($1^{st}$ ligand)(metal)($2^{nd}$ ligand) and then incorporated this multi-ligand complex additive into the polymer electrolyte.

Appropriate $2^{nd}$ ligands are small organic molecules or polymers and/or copolymers with functional groups which can also coordinate with metal ions. The $2^{nd}$ ligands are soluble in a PFSA ionomer dispersion or hydrocarbon ionomer solutions. The $2^{nd}$ ligand can be selected from the group consisting of molecules having the chemical structures disclosed in WO2011/057769. An exemplary $2^{nd}$ ligand here is bathophenanthroline.

Figure 1C:
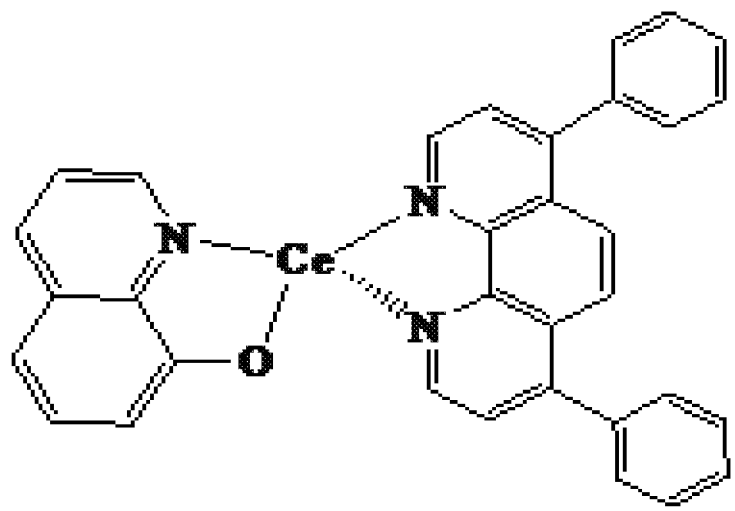
FIG. 1c shows the chemical structure of an exemplary improved complex additive of the invention.

FIG. 1c shows the chemical structure of an exemplary improved complex additive of the invention denoted by ($1^{st}$ ligand)(metal)($2^{nd}$ ligand). Here, the $1^{st}$ ligand is 8-hydroxyquinoline, the metal is Ce, and the $2^{nd}$ ligand is bathophenanthroline. As demonstrated in the following Examples, this exemplary complex additive provides for improved fuel cell performance and durability. Also though, it provides a marked improvement during initial conditioning over the results typically seen with (metal)($2^{nd}$ ligand) additives alone.

FIG. 1c shows an exemplary complex additive in which the $2^{nd}$ ligand is a small molecule. $2^{nd}$ ligands may also be polymers and in that regard, the complex forming units can be either on the polymer backbone or on side chains. The additives can be homopolymers of complex forming units or copolymers of complex forming units with an aromatic structure (such as poly(ether ketone), poly(ether sulfone), poly(phenylene), etc). Copolymers can be random or block copolymers. When a complex forming unit is on the polymer side chain, it can be directly attached to the polymer backbone or attached via a spacer. The polymer backbone can be an aromatic, semi- or perfluoro aliphatic polymer. On each side chain, there can be one complex forming unit or multiple complex forming units.

Ligands in the improved additives are desirably selected based on an anticipated high reactive rate to decompose hydrogen peroxide, low impact on fuel cell performance, low leaching out of catalyst material, and low water washability.

The metal and ligand components can each potentially serve as either a good free radical scavenger or a hydrogen peroxide decomposition catalyst (without forming new radicals) or both. Therefore, each of these chemicals itself can be a good additive for improving durability of a proton conducting membrane. While the presence of either of the ligand components or metal component alone increases membrane stability, under certain conditions, it may however adversely affect fuel cell performance. With the present additives, the presence of both the metal component and the ligand components however mitigates the performance loss otherwise seen. Thus, the additives provide durability benefits without performance loss and with acceptable initial conditioning performance.

In the complex additives of the invention, various molar ratios of (metal) to ($1^{st}$ ligand) or to ($2^{nd}$ ligand) may be contemplated. Herein, the molar ratio refers to average amounts of the components present. In practice, the additives are expected to exist as mixtures of one or more (1st ligand)$_m$(metal)($2^{nd}$ ligand)$_n$ complexes, where m and n might be from about 1-3 or more depending on the situation.

The presently disclosed additives can be used in the membrane, an ionomer of an electrode (cathode and/or anode), and/or in a spray coating on gas diffusion electrode (GDE) surfaces in a solid polymer electrolyte fuel cell.

The above-mentioned additives are used to prepare composite PFSA or hydrocarbon electrolyte in order to improve durability and performance of fuel cells. The composite electrolyte comprises a conventional perfluorosulfonic acid ionomer or hydrocarbon ionomer plus a suitable amount of additive.

One method for preparing an electrolyte composite of the invention is to first synthesize the complex additive from desired starting ligands and metal precursors. (For instance, synthesis of a complex of ruthenium (II) and bathophenanthroline is described in Langmuir 2008, 24: 11684-11690). The improved electrolyte composite can then be prepared by dissolving the synthesized complex additive in a chosen PFSA ionomer dispersion or hydrocarbon ionomer solution.

Alternatively however, the metal and ligand components or precursors can be dissolved and mixed, at elevated temperature as needed, into an ionomer dispersion or solution directly and thereby provide composite electrolyte material comprising additive directly upon removal of the solvent. Where possible, this procedure is preferred as it saves preparation steps.

[Note that it is possible to employ metal precursors that are insoluble in water or solvents such as alcohol per se. This is possible because the metal precursors are soluble in strong acid solutions/dispersions or may react with the ionomer present in a dispersion or solution and then be soluble thereafter.]

The composite dispersion/solution can then be used to cast membrane electrolyte, to prepare catalyst layers, or otherwise be incorporated into membrane electrode assemblies in any conventional manner as desired. In particular, a membrane can be cast directly from the mixture dispersion/solution. In another embodiment, the dispersion/solution can be spray coated onto the surface of a gas diffusion electrode (GDE). The coated GDE can then be bonded with a proton conducting membrane to make a membrane electrode assembly. In another embodiment, a catalyst can be mixed with the ionomer dispersion/solution containing the additive to make an ink, and then the ink can be coated onto a membrane to make a catalyst coated membrane.

Note that the mechanical strength of cast membranes can be further improved with reinforcement technology. Furthermore, these additives can be immobilized in a porous reinforcement matrix to suppress leakage of the additives from the fuel cell. These additives can also be added into either anode or cathode layer through an ink mixing process and/or spray coating process for fuel cells. Additives can adsorb on the catalyst metal surface blocking the active sites from radical attacking, and inhibit catalyst metal corrosion during fuel cell operation. The degradation of the MEA can be significantly slowed down by using these additives in the membrane and the catalyst layer.

The amount of additive used in the composite electrolyte will depend on several factors. Preferably, a minimal amount of additive is used to obtain these results.

The complex additives of the invention may be expected to provide certain durability and performance benefits based on the behavior of the individual metal and ligand components known in the prior art. In addition, an improvement in performance during initial conditioning is expected from the use of complexes comprising $1^{st}$ ligands of the invention.

The following examples are illustrative of the invention but should not be construed as limiting in any way.

EXAMPLES

Polymer membrane samples comprising improved additives of the invention were prepared as described below. In addition, polymer membrane samples were prepared with a prior art additive and with no additive for comparative purposes.

The membrane samples were all cast from dispersions of Nafion® perfluorosulfonic acid (PFSA) ionomer with equivalent weight EW875. For the membrane samples comprising the additives, appropriate additives or additive components were added into the ionomer dispersion while stirring to obtain transparent ionomer dispersions comprising the additives. The obtained transparent solutions were then degassed, and cast on a carrier. After evaporating the solvent off, the obtained membrane samples were annealed at 150° C. for 1 hour.

The following inventive samples were prepared:

Inventive Example Ce#1

In a vial, 0.0312 grams of 8-hydroxyquinoline (0.52% weight of PFSA), 0.0180 grams of bathophenanthroline (0.3% weight of PFSA), 0.01713 grams of $Ce_2(CO_3)_3.xH_2O$ (0.28% weight of PFSA), and 27.27 grams of PFSA ionomer dispersion (solids concentration 22%) were stirred overnight at 50° C. A (8-hydroxyquinoline)(Ce)(bathophenanthroline) additive (hereinafter denoted as Ce#1) was formed in solution and a membrane sample comprising this Ce#1 additive was cast from the solution.

Inventive Example Ce#2

In a vial, 0.0312 grams of 8-hydroxyquinoline (0.52% weight of PFSA), 0.0060 grams of bathophenanthroline (0.1% weight of PFSA), 0.01713 grams of $Ce_2(CO_3)_3.xH_2O$ (0.28% weight of PFSA), and 27.27 grams of PFSA ionomer dispersion (solids concentration 22%) were stirred overnight at 50° C. A (8-hydroxyquinoline)(Ce)(bathophenanthroline) additive (hereinafter denoted as Ce#2) was formed in solution and a membrane sample comprising this Ce#2 additive was cast from the solution.

Inventive Example Ce#3

In a vial, 0.0312 grams of 8-hydroxyquinoline (0.52% weight of PFSA), 0.012 grams of bathophenanthroline (0.2% weight of PFSA), 0.01713 grams of $Ce_2(CO_3)_3.xH_2O$ (0.28% weight of PFSA), and 27.27 grams of PFSA ionomer dispersion (solids concentration 22%) were stirred overnight at 50° C. A (8-hydroxyquinoline)(Ce)(bathophenanthroline) additive (hereinafter denoted as Ce#3) was formed in solution and a membrane sample comprising this Ce#3 additive was cast from the solution.

Inventive Example Ce#4

In a vial, 0.0801 grams of 5,7-diphenylquinolin-8-ol (1.3% weight of PFSA), 0.0161 grams of $Ce_2(CO_3)_3.xH_2O$ (0.27% weight of PFSA), and 27.27 grams of PFSA ionomer dispersion (solids concentration 22%) were stirred overnight at 50° C. A (5,7-diphenylquinolin-8-ol)(Ce) additive (hereinafter denoted as Ce#4) was formed in solution and a membrane sample comprising this
Ce#4 additive was cast from the solution.

Inventive Example Ce#5

In a vial, 0.0312 grams of 8-hydroxyquinoline (0.52% weight of PFSA), 0.01713 grams of $Ce_2(CO_3)_3.xH_2O$ (0.28% weight of PFSA), and 27.27 grams of PFSA ionomer dispersion (solids concentration 22%) were stirred overnight at 50° C. A (8-hydroxyquinoline)(Ce) additive (hereinafter denoted as Ce#5) was formed in solution and a membrane sample comprising this Ce#5 additive was cast from the solution.

Inventive Example Ce#6

In a vial, 0.0312 grams of 8-hydroxyquinoline (0.52% weight of PFSA), 0.0047 grams of $MnO_2$ (0.078% weight of PFSA), and 27.27 grams of PFSA ionomer dispersion (solids concentration 22%) were stirred overnight at 50° C. A (8-hydroxyquinoline)(Mn) additive (hereinafter denoted as Ce#6) was formed in solution and a membrane sample comprising this Ce#6 additive was cast from the solution.

Inventive Example Ce#7

In a first beaker, 3.004 g of 8-hydroxyquinoline was dissolved in 79.30 g of $CH_3CH_2OH$. In a second beaker, 2.9639 g $Ce_2(CO_3)_3.xH_2O$ was dissolved in 20.2 g $H_2O$. The solution from the first beaker was added to the second beaker solution and was stirred at room temperature for 65 hours.

A dark green solid precipitated from this stirred solution. The contents were filtered and washed with water to provide (8-hydroxyquinoline)$_3$Ce product.

In a vial, 0.0417 grams of the (8-hydroxyquinoline)$_3$Ce, and 27.87 grams of PFSA ionomer dispersion (solids concentration 22%) were stirred overnight at 50° C. A (8-hydroxyquinoline)$_3$(Ce) additive (hereinafter denoted as Ce#7) was formed in solution and a membrane sample comprising this Ce#7 additive was cast from the solution.

Inventive Example Mn#1

In a vial, 0.0174 grams of bathophenanthroline (0.3% weight of PFSA), 0.0060 grams of MnO$_2$ (0.1% weight of PFSA), 26.31 grams of PFSA ionomer dispersion (solids concentration 22%) were stirred overnight at 50° C. Then 0.0301 grams of 8-hydroxyquinoline (0.52% weight of PFSA) was added to the above vial and stirring continued overnight. A (8-hydroxyquinoline)(Mn)(bathophenanthroline) additive (hereinafter denoted as Mn#1) was formed in solution and a membrane sample comprising this Mn#1 additive was cast from the solution.

The following comparative samples were also obtained or prepared.

Comparative Example Nafion

For testing in fuel cells, a conventional membrane without additive was cast from a dispersion of Nafion® perfluorosulfonic acid (PFSA) ionomer having equivalent weight EW875 (hereinafter referred as Nafion).

Comparative Example MnBPhen

A comparative sample additive was also prepared in accordance with the prior art in which the (ligand) component was bathophenanthroline. This is similar to sample C2 in the aforementioned WO2011057769 patent application but with the concentration increased from 1% to 1.2%.

In a vial, 0.0247 g bathophenanthroline (1.2 weight % of PFSA), 0.0016 g MnO$_2$ (0.078% weight of PFSA) and 9.36 g PFSA ionomer dispersion (solid concentration 22%) were stirred overnight at 50° C. A (Mn)(bathophenanthroline) additive (hereinafter denoted as MnBPhen) was formed in solution and a membrane sample comprising 1.2% of this C2 additive was cast from the solution.

A series of experimental fuel cells were made using the preceding samples as the membrane electrolyte in order to evaluate their performance and durability characteristics. Individual membrane electrode assemblies (MEAs) were made by bonding the appropriate membrane sample between cathode and anode electrodes. The cathode and anode comprised conventional carbon supported platinum catalysts with Pt loadings of 0.7 mg/cm$^2$ and 0.3 mg/cm$^2$ respectively. These MEAs were then sandwiched between anode and cathode gas diffusion layers comprising commercial carbon fibre paper and bonded together under elevated temperature and pressure. Finally, the bonded assemblies were placed between appropriate cathode and anode flow field plates having straight flow field channels in order to complete the experimental fuel cell constructions.

Performance evaluation was carried out using 5-cells in series stacks comprising cells with different MEAs, active areas of 48.4 cm$^2$, and in which individual cell performance was monitored. For durability (chemical stability) evaluation, 5-cells in series stacks comprising the same cell types and hardware was used.

The fuel cells were all initially conditioned by operating at a current density of 1.5 A/cm$^2$, with hydrogen and air as the supplied reactants at high stoichiometries and at 100% relative humidity (RH), and at a temperature of 68° C. overnight.

Figure 2:
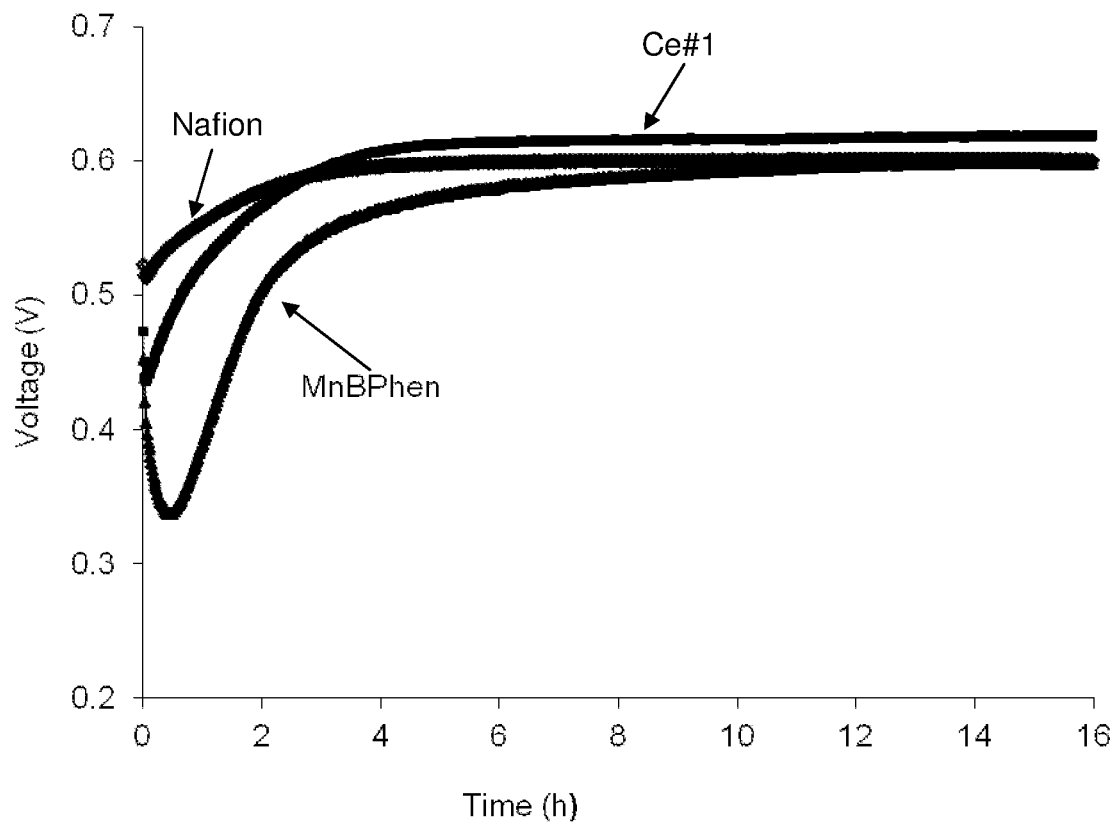
FIG. 2 compares the voltage versus time characteristics of several fuel cells of the Examples during an initial conditioning operation.

FIG. 2 compares the voltage versus time characteristics of the fuel cells comprising the Nafion, MnBPhen, and Ce#1 membrane samples respectively. (The results obtained for the Ce#2 and Ce#3 fuel cells were similar to those shown for the Ce#1 fuel cell and have not been plotted in FIG. 2 merely to avoid clutter.) As is evident from FIG. 2, the initial output voltage from the fuel cells is somewhat lower than nominal and it takes a period of conditioning before the fuel cells operate steadily at their nominal output voltage. The cell with the conventional Nafion membrane (with no additive) showed the best results during this initial conditioning operation. Initially, the Nafion cell output was about 0.52 V and this rose steadily to nominal over a few hours of operation. The MnBPhen cell on the other hand initially output a much lower voltage, which then dropped even further during the initial conditioning (as low as 0.34 V) before recovering and then rising to a nominal voltage output. Compared to the Nafion cell, it took several additional hours of conditioning time before the MnBPhen cell voltage stabilized. The cell with the inventive Ce#1 membrane also provided a somewhat lower initial output voltage which dropped modestly for a few minutes. Thereafter however, the output voltage rose steadily and stabilized in about the same timeframe as that for the Nafion cell. The results of FIG. 2 confirm the initial conditioning problem associated with the prior art additives of WO2011057769 but demonstrate that an additive of the present invention can provide substantially improved results in that regard.

Further performance characteristics of the fuel cells were obtained by measuring output voltage as a function of current density (i.e. a polarization plot) under a variety of operating conditions that would typically be experienced in automotive applications. In all cases, testing was done using hydrogen at the anode, air at the cathode, and at gas stoichiometries of 9 and 12 respectively. The varied operating conditions involved here are summarized below and include:

Normal: 68° C., 70% RH
Hot & Dry: 85° C., 45% RH
Cool and dry: 40° C., 50% RH

Figure 3:
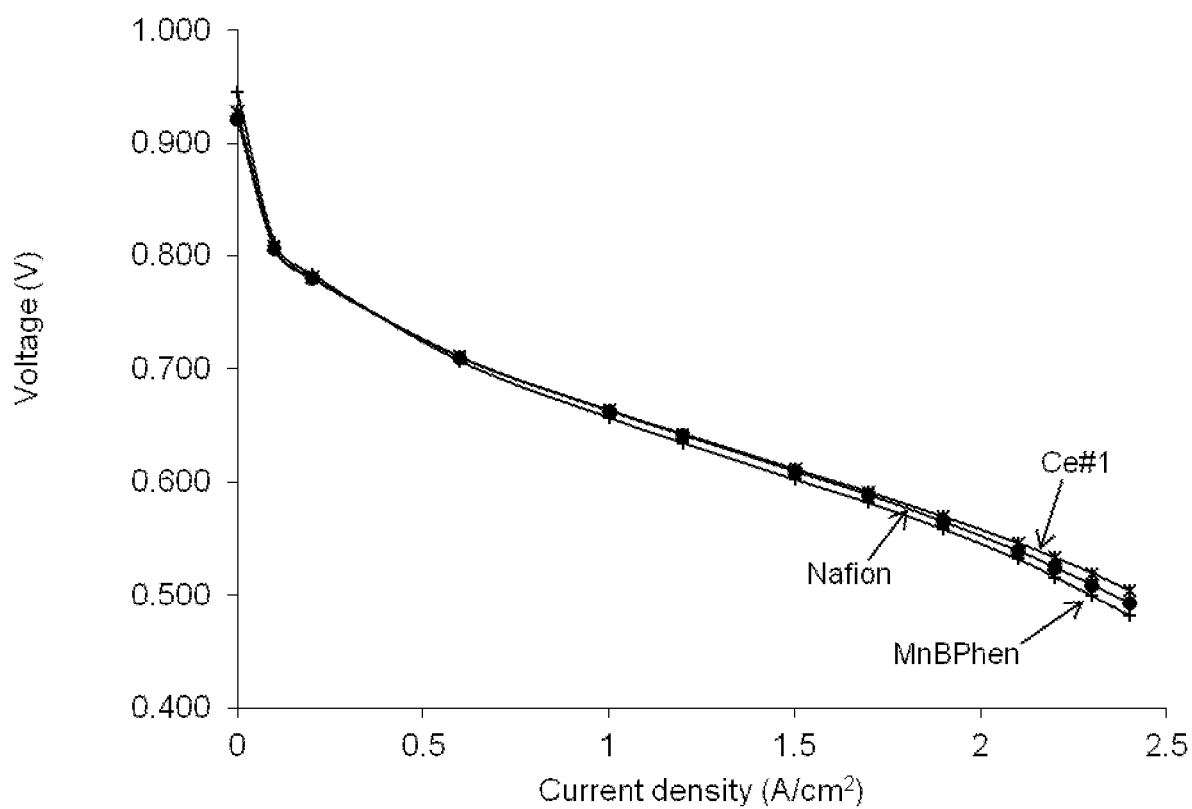
FIG. 3 shows the polarization plots obtained for several fuel cells of the Examples under Normal operating conditions.
Figure 4:
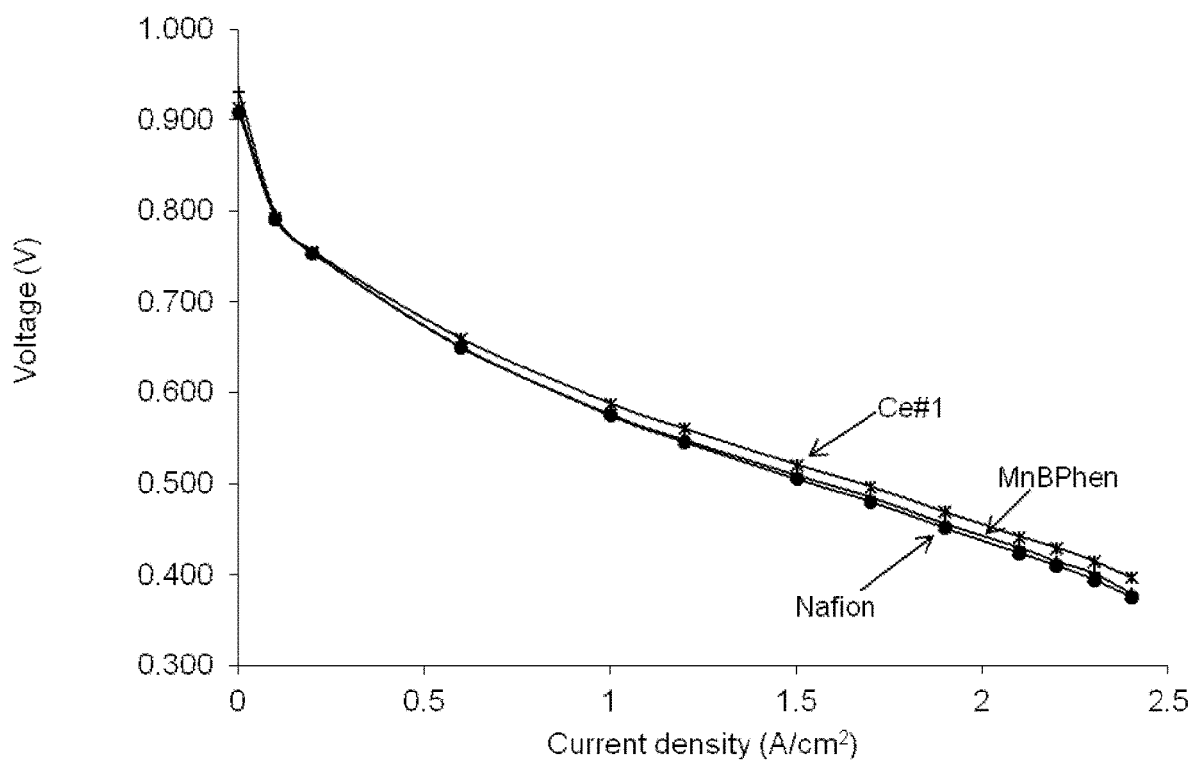
FIG. 4 shows the polarization plots obtained for several fuel cells of the Examples under Hot & Dry operating conditions.
Figure 5:
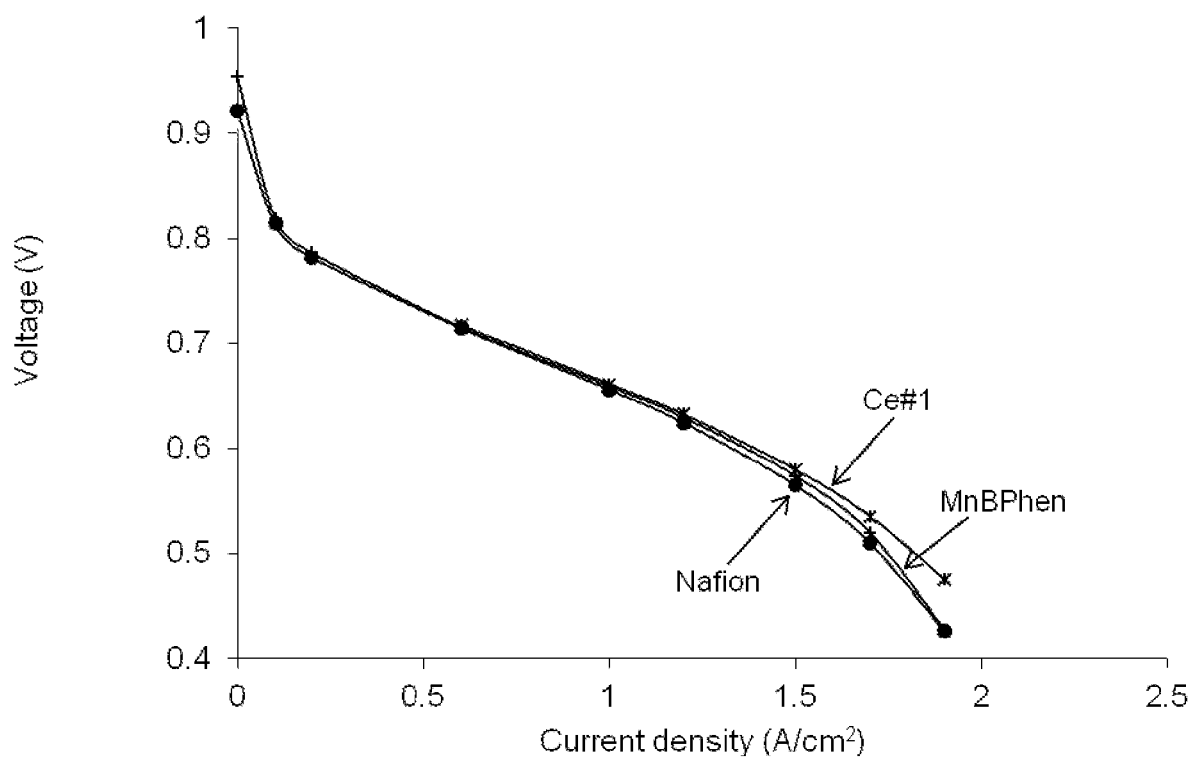
FIG. 5 shows the polarization plots obtained for several fuel cells of the Examples under Cool & Dry operating conditions.

FIG. 3 shows the polarization plots obtained for the Nafion, MnBPhen, and Ce#1 fuel cells under Normal operating conditions. (Again, the results for the other cells were obtained and were essentially similar to those for the Ce#1 cell and thus were omitted from this figure to avoid clutter.) FIG. 4 shows the polarization plots obtained for the same cells under Hot & Dry operating conditions. FIG. 5 shows the polarization plots obtained for the same cells under Cool & Dry operating conditions. In addition however, Table 1 below gives a summary for all the cells of the polarization results obtained at 1.5 A/cm$^2$ current density and under these different operating conditions. The results are similar for all the cells in all these tests.

TABLE 1

| Cell | Volts at 1.5 A/cm$^2$ under Normal conditions | Volts at 1.5 A/cm$^2$ under Hot & Dry conditions | Volts at 1.5 A/cm$^2$ under Cool and Dry conditions |
| --- | --- | --- | --- |
| Nafion | 0.61 | 0.505 | 0.566 |
| MnBPhen | 0.603 | 0.51 | 0.574 |
| Ce#1 | 0.612 | 0.521 | 0.58 |
| Ce#2 | 0.603 | 0.517 | 0.565 |

TABLE 1-continued

| Cell | Volts at 1.5 A/cm² under Normal conditions | Volts at 1.5 A/cm² under Hot & Dry conditions | Volts at 1.5 A/cm² under Cool and Dry conditions |
|---|---|---|---|
| Ce#3 | 0.612 | 0.514 | 0.586 |
| Ce#4 | 0.612 | 0.537 | / |
| Ce#5 | 0.623 | 0.534 | 0.592 |
| Ce#6 | 0.604 | 0.497 | 0.551 |
| Ce#7 | 0.609 | 0.492 | 0.569 |

In an additional performance test, the sensitivity of the fuel cells to the relative humidity of the fuel supplied to the anodes was determined. The same cells were tested here at a current density of 1.5 A/cm², again with hydrogen and air as the supplied reactants, and at a temperature of 90° C. The cathode reactant was at 30% RH. However, the anode reactant RH was varied from 30% to 80%.

Figure 6:
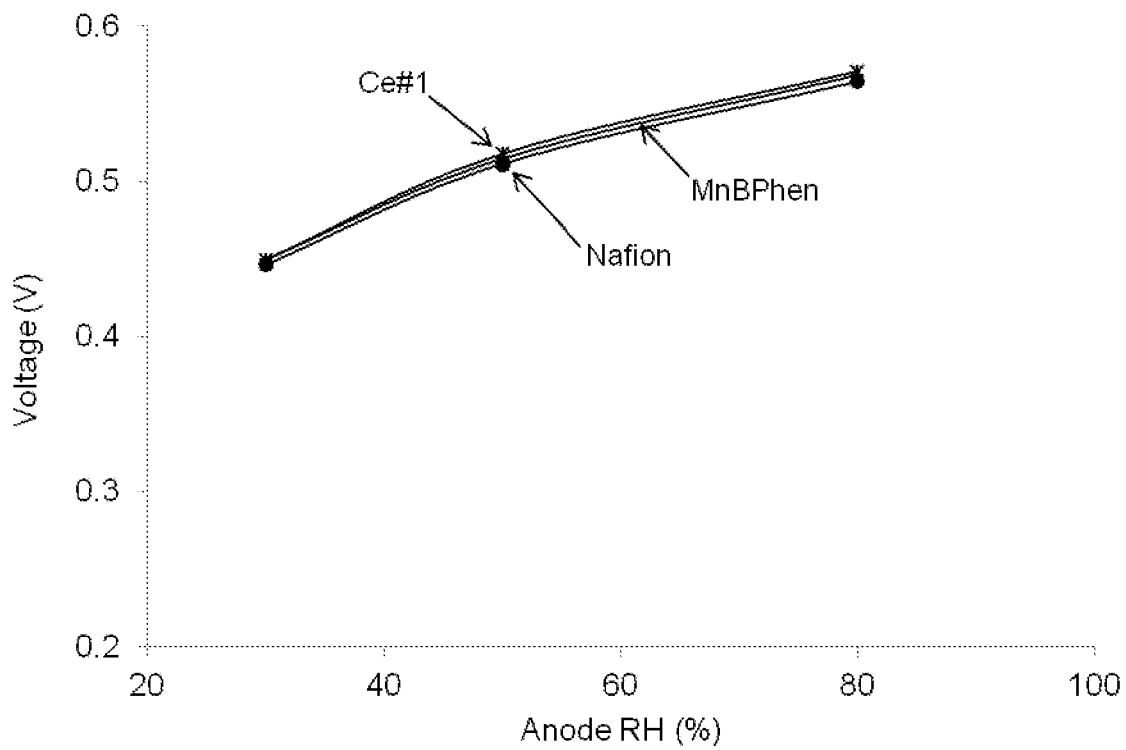
FIG. 6 shows the voltages obtained for several fuel cells of the Examples at 1.5 $A/cm^2$ as a function of the anode RH.

FIG. 6 shows the voltages obtained for the Nafion, MnBPhen, and Ce#1 fuel cells at 1.5 A/cm² as a function of the anode RH. The results are similar all the cells.

The results shown in FIGS. 3 to 6 and Tables 1 and 2 above demonstrate that the performance of the inventive fuel cells under a variety of conditions is not significantly adversely affected by the use of the additives of the present invention.

The chemical stability of example membranes was evaluated with 5 cells in series stacks under open circuit voltage (OCV) at 30% relative humidity (RH) and 95° C. The supplied gas flow rates were 2 and 12 slpm/cell for hydrogen and air respectively. And the OCV of each cell in the stack was monitored over time. Durability results for the samples tested are provided in Table 2. Table 2 below tabulates the length of time (i.e. cell lifetime) for two (2) cells in the test stack to fail

TABLE 2

| Cell | OCV lifetime (hours) |
|---|---|
| Nafion | 52 |
| MnBPhen | 433 |
| Ce#1 | 525 |
| Ce#4 | 538 |
| Ce#5 | 194 |
| Ce#6 | 171 |
| Ce#7 | 222 |

As is evident from the results in Table 2, not only does the inventive additive provide a substantial improvement in durability when compared to a conventional Nafion based fuel cell, but it also provides a marked improvement in durability when compared to a durable fuel cell made with an additive of the aforementioned WO2011057769 patent application. The cell or OCV lifetime of the Ce#4 cell is much longer than that of the Ce#5 cell. It is speculated here that electron donating groups (phenyl) on 8-hydroxyquinoline will improve electron transfers in the metal complexes, and consequently increase the reactivity of metal complexes, which agrees with the results for bipyridine type additive in the aforementioned WO2011057769 patent application.

Comparing the Ce#5 and Ce#7 cells, these samples have same complexes, but are prepared in different ways. For the Ce#5 cell, 8-hydroxyquinoline and $Ce_2(CO_3)_3 \cdot xH_2O$ are added to PFSA ionomer dispersion to form a complex additive (denoted as the "in-situ method"). For the Ce#7 cell, a complex of 8-hydroxyquinoline and $Ce_2(CO_3)_3 \cdot xH_2O$ is synthesized first, and then this is added to PFSA ionomer dispersion to form a complex additive of the invention (denoted as the "ex-situ method"). Based on the Table 1 and Table 2 results, both methods can improve membrane chemical stability and provide similar OCV lifetimes. However, use of the in-situ method results in higher cell performance than use of the ex-situ method. The reason for this may be associated with the morphology of the complexes in the membranes and with the interaction between the complexes and PFSA ionomer.

During operation of fuel cell stacks, it is known that certain prior art additives can be washed out of the membrane electrolytes (known as "washout") and thus cease to provide their intended function. Thus, the ability of the complex additives of the invention to resist washout was also evaluated. This was done by preparing two 3 cells in series stacks and subjecting one stack to significant washout conditions (denoted "With washout") while the other stack was not subjected to washout conditions at all (denoted "Without washout"). The washout conditions comprised 20 cycles: each cycle (24 hours in duration for each cycle) consists of conditioning the stack for 23 hours at 68° C., 1.5 A/cm2, 95% RH, 2.7/2.5 bara (Anode/Cathode) gas pressure, 6/2 slpm gas flow (cathode/anode), and then followed by 5 voltage cycles from 0.6 V to 0.85 V (totally 1 hour for 5 voltage cycles).

Figure 7:
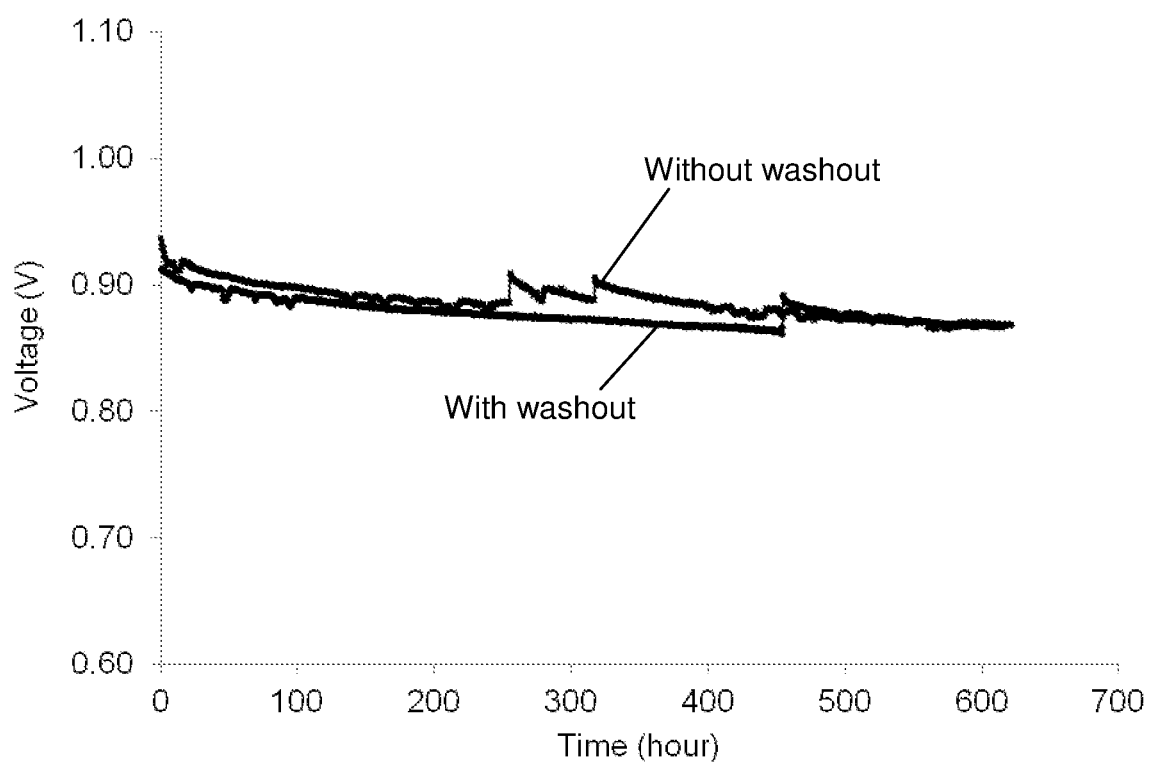
FIG. 7 compares the OCV versus time results for the "With washout" and "Without washout" stacks in the Examples.
Figure 8:
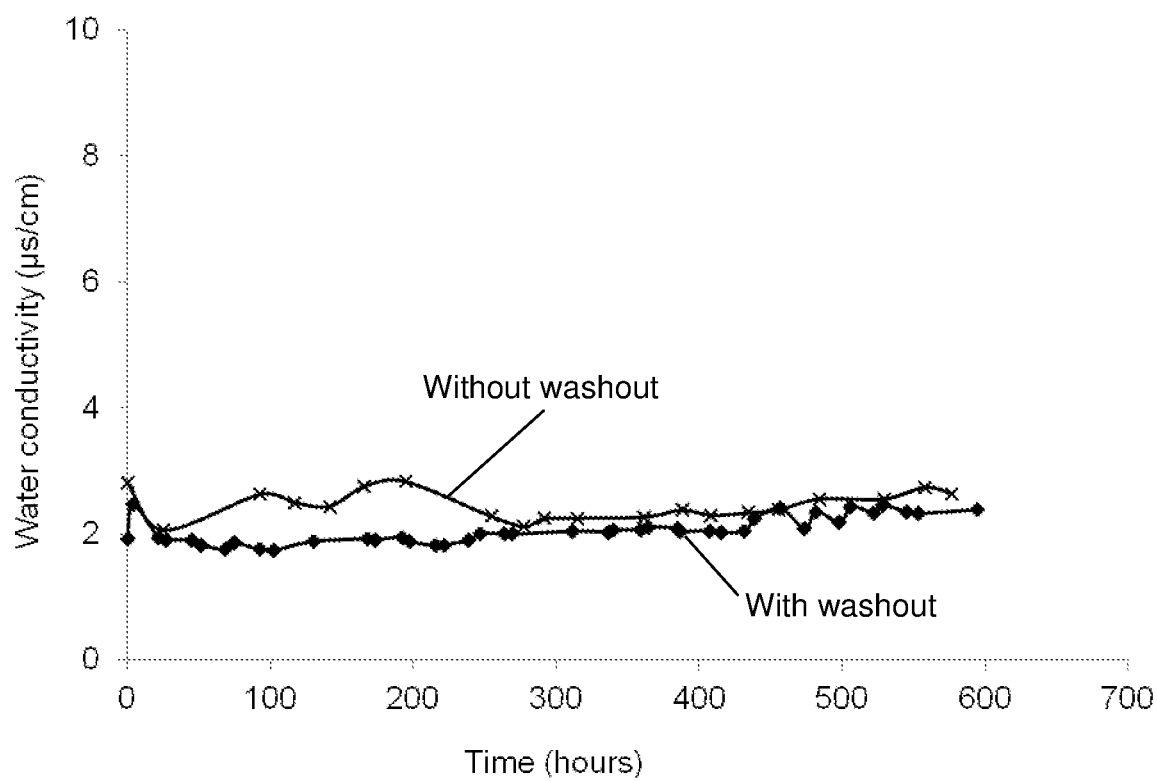
FIG. 8 compares the conductivity of the product water versus time for the "With washout" and "Without washout" stacks in the Examples.

The OCV lifetime was then determined for both stacks. FIG. 7 compares the OCV versus time results for the "With washout" and "Without washout" stacks. No significant difference was noticed. In addition, product water was collected over time from the operating fuel cell stacks and its conductivity was measured. An increase in conductivity is associated with the presence of fluorine and hence with the degradation of the membrane electrolyte. FIG. 8 compares the conductivity of the product water versus time for the "With washout" and "Without washout" stacks. Again, no significant difference was noticed. The absence of any significant difference in the results shown in FIGS. 7 and 8 suggests that no significant washout of the additive has occurred.

The preceding Examples illustrate that additives of the invention improve the results obtained from fuel cells during initial conditioning and improve durability, without adversely affecting other performance characteristics.

All of the above U.S. patents, U.S. patent application publications, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

What is claimed is:

1. A proton conducting composite polymer electrolyte for a membrane electrode assembly in a solid polymer electrolyte fuel cell comprising
   (a) a proton conducting ionomer and
   (b) a ($1^{st}$ ligand)(metal) complex additive separate from the proton conducting ionomer and in an amount sufficient to improve durability of said proton conducting ionomer, wherein:

the (metal) in the complex is selected from the group consisting of metals, metal alloys, metal oxides, metal salts and combinations thereof;

the (1st ligand) in the complex comprises a molecule bearing metal chelating moieties, or a polymer bearing the metal chelating moieties of the molecule, wherein the chemical structure of the molecule is 8-hydroxyquinoline or a derivative of 8-hydroxyquinoline.

2. The composite polymer electrolyte of claim 1 wherein the (metal) is Ce or Mn.

3. The composite polymer electrolyte of claim 1 wherein the (1st ligand) is

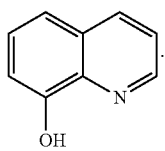 [SMILES: Oc1cccc2cccnc12]

4. The composite polymer electrolyte of claim 1 wherein the (1st ligand) is

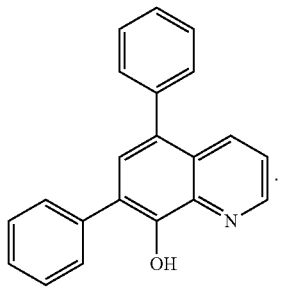 [SMILES: Oc1c(-c2ccccc2)cc(-c2ccccc2)c2cccnc12]

5. The composite polymer electrolyte of claim 1 wherein the complex additive comprises a (1st ligand)(metal)(2nd ligand) complex additive wherein:

the (2nd ligand) in the complex comprises a molecule or polymer thereof wherein the chemical structure of the molecule is selected from the group consisting of:

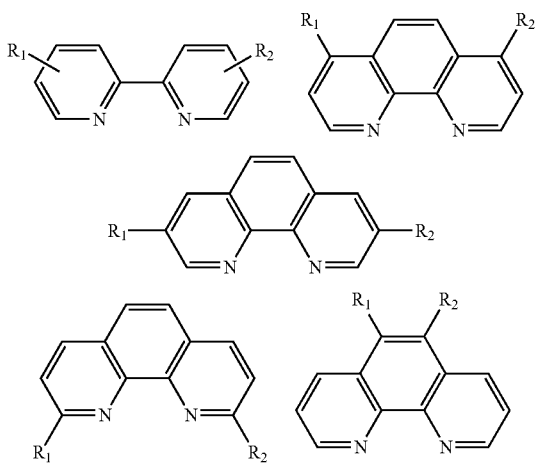

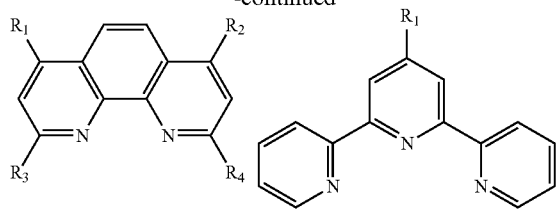

wherein $R_1$, $R_3$ and $R_4$ are selected from the group consisting of H, $CH_3(CH_2)$, $CH_3(CH_2)_nO$, $CF_3(CF_2)_n$, $CF_3(CF_2)_nO$, COOH, $PO(OH)_2$, $SO_3H$, $NH_2$, OH, and

wherein X is H, COOH, $PO(OH)_2$ or $SO_3H$ and n is an integer from 0 to 10; and wherein $R_2$ is selected from the group consisting of $CH_3(CH_2)_n$, $CH_3(CH_2)_nO$, $CF_3(CF_2)_n$, $CF_3(CF_2)_nO$, COOH, $PO(OH)_2$, $SO_3H$, $NH_2$, OH, and

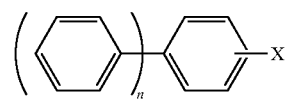

wherein X is H, COOH, $PO(OH)_2$ or $SO_3H$ and n is an integer from 0 to 10.

6. The composite polymer electrolyte of claim 5 wherein the (metal) is Ce or Mn.

7. The composite polymer electrolyte of claim 5 wherein the (2nd ligand) is bathophenanthroline.

8. A proton conducting composite polymer electrolyte for a membrane electrode assembly in a solid polymer electrolyte fuel cell comprising a proton conducting ionomer and an amount of a (1st ligand)(metal)(2nd ligand) complex additive, wherein the complex additive is

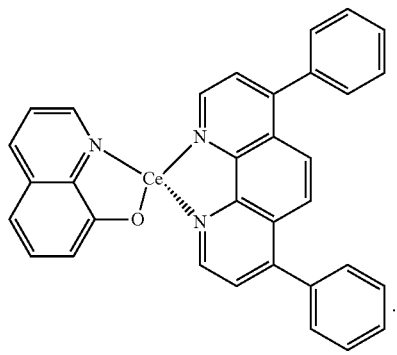

9. A membrane electrode assembly for a solid polymer electrolyte fuel cell comprising an anode catalyst layer, a membrane electrolyte, a cathode catalyst layer and the composite polymer electrolyte of claim 1.

10. The membrane electrode assembly of claim 9 wherein the membrane electrolyte comprises the composite polymer electrolyte of claim 1.

11. A solid polymer electrolyte fuel cell comprising the membrane electrode assembly of claim 9.

12. A method of making the composite polymer electrolyte of claim 1 comprising:
preparing an amount of (metal) from a precursor for the (metal);
preparing an amount of ($1^{st}$ ligand);
mixing the amount of (metal) and the amount of ($1^{st}$ ligand) in a solution or dispersion comprising the proton conducting ionomer thereby preparing the composite polymer electrolyte in the solution or dispersion; and
separating out the composite polymer electrolyte from the solution or dispersion.

13. A method of making the composite polymer electrolyte of claim 1 comprising:
preparing an amount of (metal) from a precursor for the (metal);
preparing an amount of ($1^{st}$ ligand);
synthesizing the ($1^{st}$ ligand)(metal) complex additive from the amount of (metal) and the amount of ($1^{st}$ ligand);
dissolving the ($1^{st}$ ligand)(metal) complex additive in a solution or dispersion comprising the proton conducting ionomer thereby preparing the composite polymer electrolyte in the solution or dispersion; and
separating out the composite polymer electrolyte from the solution or dispersion.

14. A method of making the composite polymer electrolyte of claim 5 comprising:
preparing an amount of (metal) from a precursor for the (metal);
preparing an amount of ($1^{st}$ ligand);
preparing an amount of ($2^{nd}$ ligand);
mixing the amount of (metal), the amount of ($1^{st}$ ligand), and the amount of ($2^{nd}$ ligand) in a solution or dispersion comprising the proton conducting ionomer thereby preparing the composite polymer electrolyte in the solution or dispersion; and
separating out the composite polymer electrolyte from the solution or dispersion.

15. A method of making the composite polymer electrolyte of claim 5 comprising:
preparing an amount of (metal) from a precursor for the (metal);
preparing an amount of ($1^{st}$ ligand);
preparing an amount of ($2^{nd}$ ligand);
synthesizing the ($1^{st}$ ligand)(metal)($2^{nd}$ ligand) complex additive from the amount of (metal), the amount of ($1^{st}$ ligand), and the amount of ($2^{nd}$ ligand);
dissolving the ($1^{st}$ ligand)(metal)($2^{nd}$ ligand) complex additive in a solution or dispersion comprising the proton conducting ionomer thereby preparing the composite polymer electrolyte in the solution or dispersion; and
separating out the composite polymer electrolyte from the solution or dispersion.

16. The method of claim 12, wherein the precursor for the (metal) is $Ce_2(CO_3)_3 \cdot xH_2O$ or $MnO_2$.

17. The method of claim 12, wherein the ($1^{st}$ ligand) is 8-hydroxyquinoline.

18. The method of claim 12, wherein the proton conducting ionomer is perfluorosulfonic acid ionomer or hydrocarbon ionomer.

19. The method of claim 14, wherein the ($2^{nd}$ ligand) is bathophenanthroline.

* * * * *